United States Patent Office 3,321,406
Patented May 23, 1967

3,321,406
ALKALI METAL CONDENSED PHOSPHATE MATERIALS, PROCESSES FOR PREPARING SAME AND RESULTING COMPOSITIONS
Chung Yu Shen, Olivette, Mo., assignor to Monsanto Company, a corporation of Delaware
No Drawing. Filed Aug. 14, 1963, Ser. No. 301,965
15 Claims. (Cl. 252—137)

This application is a continuation-in-part of application Ser. No. 266,170, filed Mar. 19, 1963.

This invention pertains to alkali metal condensed phosphate materials, processes for preparing same and resulting compositions, and, more particularly, to alkali metal condensed phosphate materials which are extremely well suited for use in water-softening and detergent compositions, and to the compositions resulting therefrom.

The "so-called" sodium hexametaphosphate glasses have found some application in practically every field of activity in which water is involved, particularly in water-softening applications. These glasses are usually made by dehydrating solutions of sodium orthophosphate liquor, melting the resulting solution in a furnace and chilling the melt to form the so-called sodium hexametaphosphate glasses. As can be appreciated, the heat required to prepare the condensed phosphate glasses by the conventional means is considerable because of the large amount of water, both as free and molecularly bound water, which must be removed. The glassy, amphorous phosphates now commercially available are, in general, limited to the $Na_2O/P_2O_5$ mole ratio below 2:1, because above this ratio objectionable amounts of crystalline sodium phosphate will be present in the quenched melt [e.g., see Westman et al., J. Am. Ceram., 40,293 (1957)], thus this limits the use of glassy phosphates such as sodium hexametaphosphates without further treating where high alkalinity is desired. In addition, these glassy phosphates exhibit other undesirable properties, such as, being hygroscopic, exhibiting caking tendencies and having a relatively slow dissolution rate in aqueous media even when further treated by such expensive means as mechanical grinding into granular particles. As can be appreciated, an alkali metal condensed phosphate material which can be prepared by simple and inexpensive methods and which exhibits improved properties, such as, being suitable for use in aqueous alkaline media, is substantially non-hygroscopic and free-flowing and is rapidly soluble in aqueous media would represent an advancement in this art.

Therefore, it is an object of this invention to provide alkali metal condensed phosphate materials which exhibit improved properties in aqueous media.

It is another object of this invention to provide improved alkali metal condensed phosphate materials which, among other things, are substantially non-hydroscopic and free-flowing, suitable for use in aqueous alkaline systems and are rapidly soluble in aqueous media.

It is another object of this invention to provide improved alkali metal condensed phosphate materials which are extremely well suited for use in water-softening compositions and detergent compositions.

It is a still further object of this invention to provide processes for preparing alkali metal condensed phosphate materials which exhibit improved properties in aqueous media.

It is a still further object of this invention to provide simple and inexpensive processes for preparing alkali metal condensed phosphate materials which exhibit improved properties in aqueous media.

And a still further object of this invention to provide detergent compositions containing alkali metal condensed phosphate materials which exhibit improved properties in aqueous media.

These and other objects will become apparent from a reading of the following detailed description.

In general, the alkali metal condensed phosphate material of the present invention can be characterized as readily soluble, free-flowing, non-vitreous solids having an alkali metal to phosphorus molar ratio of between about .5 and about 5 and capable of sequestering at least one gram of calcium per 100 grams of alkali metal condensed phosphate material in the presence of oxalate in a solution having a pH of 12 and a temperature of 25° C. by the procedure described in Irani and Callis, The Journal of the American Oil Chemists' Society, volume 39, No. 3, pp. 156–159 (1962). In some cases, the alkali metal phosphates can be prepared containing free condensed phosphoric acid and free alkali metal carbonate material. Although all of the foregoing products are readily soluble in water, the products containing the free condensed phosphoric acid and the free alkali metal carbonate exhibit a high dissolution rate even in cold water since these materials when contacted with sufficient water will complete the reaction between the acid and carbonate material with the liberation of $CO_2$ which aids in the disintegration and dissolution of the materials. In addition, other materials may be incorporated in the alkali metal condensed phosphate material, if desired, as inert diluents or either to improve certain properties of the condensed phosphate material or to impart special properties thereto, as well as being formulated with the condensed phosphate material, all of which will be more fully discussed hereinafter.

Condensed phosphoric acid is a phosphoric acid containing any quantity of one or more polyphosphoric acids and/or metaphosphoric acids and any such acid can be employed in this invention. The polyphosphoric acids include pyrophosphoric acid and other polymers from the tri to the nonapolymer and higher. The properties and compositions of the polyphosphoric acids vary with the $P_2O_5$ content of the condensed phosphoric acid as discussed in Van Wazer, Phosphorus and Its Compounds, Interscience Publishers, Inc., New York, N.Y., volume 1, (1958), and shown by Table 12–1, page 748. Although, in general, for the instant invention any condensed phosphoric acid is suitable as the acid source, the preferred condensed phosphoric acids are liquid mixtures ranging from about 72 percent $P_2O_5$ by weight which contains about 89.4 percent orthophosphoric acid and 10.6 percent pyrophosphoric acid to about 85 percent $P_2O_5$ by weight which contains about 1.3 percent orthophosphoric acid, 1.8 percent pyrophosphoric acid, 2.4 percent tripolyphosphoric acid, and about 94 percent of polyphosphoric acid polymers higher than tripolyphosphoric acid.

Condensed phosphoric acid may be prepared by dissolving quantities of $P_2O_5$ in orthophosphoric acid, by evaporating water from orthophosphoric acid, or by operating equipment ordinarily used for the manufacture of orthophosphoric acid from phosphorus by reacting less water with the $P_2O_5$ produced than is normally required for the manufacture of orthophosphoric acid.

Condensed phosphoric acid sources, in addition, include, in general, materials which are capable of forming condensed phosphoric acid in situ such as, tetraethyl pyrophosphate which can produce under certain conditions condensed phosphoric acid with evolution of ethylene, as well as materials which contain condensed phosphoric acids, such as commercial reagent grade so-called "metaphosphoric acid" which contains some $Na_2O$ in addition to the normal $H_2O$ and $P_2O_5$ present in the acid.

In general, any alkali metal source is suitable as long as it is capable of reacting with the condensed phosphoric acid to form a condensed phosphate material containing the desired alkali metal. It is preferred that the alkali metal source used be such as to provide only the metal oxide and phosphorous pentoxide in the desired proportion in the final product. In particular, such alkali metal sources which contain moieties capable of producing or forming gases during the reaction are preferred. Such alkali metal sources include the salts, oxides and hydroxides, such as $Na_2CO_3$, NaCl, NaOH, $Na_2O$, $K_2CO_3$, KCl, $KNO_3$, KOH, $K_2O$, $Li_2CO_3$, LiCl, $LiNO_3$, $(NH_4)_2CO_3$, $NH_4Cl$, $NH_4NO_3$, and the like, including mixtures thereof. Ammonia is included herein as an alkali metal in view of the fact that the ammonium materials exhibit substantially the same chemical properties as the alkali metal materials, such, as, the sodium and potassium salts. Although alkali metal sources of cesium, rubidium, and francium can, in some cases, be used in practicing this invention, since they are relatively expensive and are not readily available they are not believed to offer the advantages for use as the foregoing alkali metal sources. In addition, other alkali metal sources which can be used include those materials which contain organic radicals such as oxalates, citrates and the like, including mixtures thereof such as, sodium oxalate, sodium citrate, and the like. Because the sodium and potassium condensed phosphates are, in general, the most widely used phosphates and because such alkali metal sources as $Na_2CO_3$, NaOH, $K_2CO_3$, and KOH are relatively inexpensive as well as being readily available, they are the preferred alkali metal sources for use in practicing the invention.

In general, the alkali metal material and the condensed phosphoric acid need only be reacted together in an alkali metal to phosphorus molar ratio of reactants between about .5 to about 5 to produce the alkali metal condensed phosphate material. In general, molar ratios of less than about .5 are insufficient to form the desired products of the instant invention while molar ratios in excess of about 5 can form the desired products although such contains excess alkali metal material which, while not materially affecting the chemical and physical properties of the products, does not appear to offer any significant advantages. Usually, condensed phosphoric acids at room temperature and having a composition of about 72 to 82% $P_2O_5$ by weight are liquids which exhibit an oily appearance, from about 82 to 89% $P_2O_5$ by weight they progress through a tar and taffy-like stage, and above about 90% $P_2O_5$ by weight they are brittle glasses. For use in practicing this invention, the condensed phosphoric acids may be in the liquid state, in the super cooled viscous state, or in the solid form. It is preferred to use the condensed phosphoric acid in a relatively fluid liquid state for ease of handling and control of the reaction. In some cases, in order to improve the fluidity of the liquid state it may be necessary to heat the condensed phosphoric acid. In general temperatures may be used which improve the viscosity of the condensed phosphoric acid but usually not over about 400° C., with lower temperatures, i.e., not over about 100° C., being sufficient in most cases to achieve sufficient fluidity. In addition, water also may be added to improve the fluidity of the liquid state, however, when water is used it is preferred to keep the temperature of the condensed phosphoric acid below about 60° C. in order to reduce the possibility of hydrolysis of the condensed phosphoric acid which may result in excessive degradation of the condensed phosphate anions. The alkali metal source can be in the liquid state, such as being dissolved or suspended in an aqueous solution, or in the solid form, such as granular or powdered material. In most cases, the reactants need only to be admixed, preferably one reactant in the liquid form and the other reactant in the solid form, in any suitable mixing vessel in order to produce the amorphous alkali metal condensed phosphate material.

In general, the order of addition and rate of addition may be varied depending upon, inter alia, the ease of handling and control of the reaction. It is preferred, however, that the rate of addition be such as to permit sufficient admixing for completion of the reaction. In this connection it should be noted that the preferred order of addition is the addition of a liquid condensed phosphoric acid to a solid granular alkali metal material.

In general, the reaction can usually be conducted at room temperature, i.e., about 25° C. Although other temperatures may be used, it is preferable that the reaction be conducted at temperatures above about 0° C. and in no event is it necessary to use temperatures higher than the liquification temperature of the alkali metal condensed phosphate material. In most cases, the reaction is exothermic with the temperature rising in some cases as high as 100° C. and more when the reaction is initiated at room temperature. However, when the reaction releases volatile gases, such as is usually the case when materials such as $Na_2CO_3$ with $CO_2$ being evolved are used, the temperature rarely goes above about 100° C. In general, the reaction product, i.e., the alkali metal condensed phosphate material, usually produced by the reaction is a pulverulent solid material. In some cases, however, the condensed phosphate may pass through a glue-like consistency during or subsequently following the reaction before it solidifies and it is, therefore, often advantageous to recycle some of the condensed phosphate material already solidified in order to, among other things, reduce or minimize the glue-like consistency stage for ease in handling the mixture and carrying out the reaction. Although the reacting of a condensed phosphoric acid with an aqueous solution of an alkali metal is not preferred, because of the potential excess degradation of condensed phosphate anions and the need of removing the water of solution; nevertheless, with rapid drying and with an excess of recycled condensed phosphate material, it is possible to reduce the amount of degradation sufficiently to form the desired alkali metal condensed phosphate material in the desired ratio of reactants. In view of the foregoing, it is, therefore, preferable to carry out the reaction under substantially anhydrous conditions. As used herein "substantially anhydrous conditions" means carrying out the reaction using substantially anhydrous alkali metal sources, that is, those sources containing less than about 20% by weight of water of crystallization, and in the substantial absence of water except for that which may be produced during the reaction.

Although the alkali metal condensed phosphate material when examined by X-ray analysis is, in most cases, substantially amorphous, it is not necessary that it be such since, in some cases, crystalline condensed phosphate material may be present in minor amounts, that is to say, usually less than about 50% by weight.

The composition of the condensed phosphate material is believed to vary according to the amount of alkali metal material reacted with the particular condensed phosphoric acid used, however, it is believed that a mixture of orthophosphates and/or condensed phosphates make up this material.

As mentioned hereinabove, alkali metal condensed phosphate materials can be prepared containing free condensed phosphoric acid and free alkali metal carbonate. These stable, effervescent materials are especially preferred because of their low hygroscopicity, high dissolution rate, sequestering ability and buffering ability. In general, this material is prepared in substantially the same manner as the alkali metal condensed phosphate material previously discussed except for distinctions, such as, the alkali metal source, alkali metal to phosphorus molar ratio, temperatures used, and manner of carrying out the process. The alkali metal source suitable for use is an alkali metal carbonate material, such as, sodium carbonate, sodium bicarbonate, sodium sesquicarbonate, potassium carbonate, potassium bicarbonate, lithium carbonate, lithium bicarbonate, ammonium carbonate, ammonium bicarbonate, and the like, including mixtures of these. Here again, although the alkali metal carbonates of cesium, rubidium and francium can, in some cases, be used in preparing these condensed phosphate materials, since they are relatively expensive and are not readily available they are not believed to offer the advantages for use as the foregoing alkali metal carbonates. Because the sodium and potassium condensed phosphate are, in general, the most widely used phosphates and because such alkali metal carbonates as $Na_2CO_3$ and $K_2CO_3$ are relatively inexpensive as well as being readily available, they are the preferred alkali metal carbonates.

In addition, another distinction to the foregoing process for preparing the alkali metal condensed phosphates is that, in general, the molar ratio of alkali metal to phosphorous of the reactants should preferably be above about 1 and the temperature during the reaction preferably maintained below about 75° C. in order to prepare a material containing a sufficient degree of free condensed phosphoric acid and free alkali metal carbonate material. Substantially higher temperatures, but generally below about 120° C., especially for the condensed acids containing a higher $P_2O_5$ percentage, can in some instances be used.

A still further condition is that during the reaction the reactants are admixed in such a manner as to minimize the possibility of complete reaction. This can usually be accomplished by such methods as carrying out the reaction at lower temperatures, i.e., between about 20° C. to about 50° C. and/or carrying out the reaction with insufficient agitation to ensure complete admixing of the reactants. Although the material may be prepared by many different methods, a typical method of preparation is to add the condensed phosphoric acid in a liquid state, preferably in a slow stream, to an agitated bed of alkali metal carbonate material in such a manner as to produce droplets of condensed phosphoric acid on the bed which partially react with the alkali metal carbonate material to form a material coated with a conglomerate mass of alkali metal condensed phosphates and alkali metal carbonate by the agitation action of the bed. This coating prevents further reaction between the encapsulated condensed phosphoric acid and the alkali metal carbonate bed. In addition, it is important that the reaction be carried out under substantially anhydrous conditions.

In general, the alkali metal condensed phosphate material containing free condensed phosphoric acid and free alkali metal carbonate material can be characterized as free flowing, non-vitreous, effervescent material having an alkali metal to phosphorus molar ratio of between about 1 to about 5 and capable of sequestering at least one gram of calcium per 100 grams of material by the procedure as hereinbefore discussed. In addition, because this material contains free condensed phosphoric acid and free alkali metal carbonate material, a useful manner of characterizing can be accomplished by elemental analysis, pH, and the volume of gas evolved in contact with water. For example, an elemental analysis can be based on percentage weights of $P_2O_5$, $H_2O$, $M_2O$ and $CO_2$, pH can be based on a 1% by weight aqueous solution at 25° C., and volume of gas evolved can be based on number of cc. of gas liberated per gram of material when the material is brought into contact with water at 25° C. In general, the preferred alkali metal condensed phosphate material containing free condensed phosphoric acid and free alkali metal carbonate material have the following elemental analysis ranges:

$P_2O_5$ between about 20% to about 60% by weight
$H_2O$ between about 2% to about 30% by weight
$M_2O$ (M being alkali metal) between about 10% to about 60% by weight
$CO_2$ between about 10% to about 35% by weight In addition, in general, the pH of a 1% by weight aqueous solution at 25° C. is between about 6.5 and about 8.5 and the volume of gas evolved when contacted with water at 25° C. is between about 5 to about 200 cc./g. of the preferred material. In general, the preferred material is an encapsulated material containing free condensed phosphoric acid coated with a conglomerated material containing free alkali metal carbonate material and alkali metal condensed phosphate material. Usually such material is in a stable solid granular form which can be milled to produce material of rather fine particle sizes, i.e., about −20 mesh (USSS series).

It is also possible to prepare an alkali metal condensed phosphate material containing free condensed phosphoric acid and free alkali metal carbonate and, in addition, other materials which can act as diluents, or either to improve certain properties of the condensed phosphate material or to impart special properties thereto. In particular are the alkaline materials, and particularly the inorganic alkaline materials, such as the hydroxides, sulfates, phosphates, silicates and the like including mixtures thereof. Especially preferred are the inorganic alkali metal alkaline materials of the foregoing materials. Of the alkali metal hydroxides, sodium hydroxide, potassium hydroxide, ammonium hydroxide and lithium hydroxide are preferred. Also, of the alkali metal sulfates, sodium, ammonium and potassium sulfates are preferred. The inorganic alkali metal phosphates include the orthophosphates, such as the mono-, di- and tri-sodium orthophosphate, the mono-, di-, and tri-potassium orthophosphates, the mono- and di-ammonium orthophosphates as well as the alkali metal condensed phosphates, such as the sodium and potassium tri-polyphosphates, pyrophosphates, and the glassy sodium and potassium hexametaphosphate, with the sodium, potassium, and mixed sodium and potassium salts of the foregoing preferred. The amorphous, glassy polyphosphates, i.e., the hexametaphosphates and the like, are generally characterized either in terms of mole ratio of $Na_2O$ (or $K_2O$) to $P_2O_5$, or in terms of average chain length, i.e., of the polyphosphate molecules in the glassy phosphate. For example, commercial sodium hexametaphosphate has a mole ratio of $Na_2O$ to $P_2O_5$ of about 1.13, and an average chain length of about 15 phosphorus atoms. In general, any of the water-soluble glassy polyphosphates, which have mole ratios of $Na_2O$ or $K_2O$ relative to $P_2O_5$ ranging between about 5:3 and about 1:1 (corresponding to an average chain length from 3 to several thousand or higher) are suitable for use in practicing the present invention. The preferred silicates are the water-soluble sodium and potassium silicates which can vary widely in composition, ranging from the tetra and disilicates having a mole ratio of $Na_2O:SiO_2$ of 1:4 and 1:2, respectively, to the more alkaline silicates, such as orthosilicates, such as the orthosilicate having a mole ratio of $Na_2O:SiO_2$ of 2:1. In addition other silicates, or mixtures of silicates, having an overall mole ratio of $Na_2O:SiO_2$ between about 1:1 and 1:4 are suitable for use in practicing the present invention. In general, any amount of the alkaline material may be used, however, usually amounts of such between about 1% to about 99% by weight on the total weight of the alkaline material and the alkali metal carbonate material are suitable, with amounts of between about 10% to about 60% being especially preferred. In general, the foregoing materials need only be admixed with the alkali metal carbonate prior to the reaction with the condensed phosphoric acid and the reaction carried out in the usual manner as hereinbefore described with respect to the alkali metal condensed phosphate material containing free condensed phosphoric acid and free alkali metal carbonate. It should be noted, however, that the foregoing alkaline material may be admixed with the dry, solid alkali metal condensed phosphate material containing free condensed phosphoric acid and free alkali metal carbonate to form a physical mixture composition.

To illustrate the invention, the following examples are presented with parts by weight used unless otherwise indicated.

EXAMPLE I

Alkali metal condensed phosphate materials of the present invention are prepared by charging alkali metal material into a reaction vessel equipped with a stirrer. The vessel is covered with a cover having a hole in it and condensed phosphoric acid is dripped onto the alkali metal material while the mixture is being stirred. The cover is used in order that any entrained alkali metal material which may have condensed with water vapor is returned to the mixture, thereby attempting to maintain a proper ratio of alkali metal to acid in the reaction mixture. The alkali metal condensed phosphate material foams and produces some heat from the reaction, and solidifies upon cooling to room temperature. These products each sequester over 1 gram of $Ca^{++}$ per 100 grams of material under the conditions described hereinbefore. The alkali metal materials, condensed phosphoric acids and amounts of each which are used are indicated in the table herebelow.

TABLE 1

| | Condensed phosphoric acid, percent $P_2O_5$ by weight | Amount of condensed phosphoric acid used, parts | Alkali metal material used | Amount of alkali metal material used, parts | Alkali metal/P molar ratio of products |
|---|---|---|---|---|---|
| (1) | 75 | 170 | Sodium carbonate | 191 | 2.0 |
| (2) | 75 | 142 | Potassium carbonate | 173 | 1.7 |
| (3) | 83 | 129 | Sodium carbonate | 132 | 1.7 |
| (4) | 83 | 129 | ___do___ | 80 | 1.0 |
| (5) | 83 | 250 | ___do___ | 271 | 1.8 |

EXAMPLE II

Effervescent materials of the present invention are prepared by adding condensed phosphoric acid in droplet form onto an agitated soda ash bed. The mixer is equipped with a jacketed cooling device in order to control the temperature at the indicated values. The effervescent products are stable, free flowing, granular materials which can withstand coarse milling to reduce the product size to about −20 mesh, however, intense milling in some instances may cause the material to undergo complete reaction. The following table summarizes the various products.

EXAMPLE III

Effervescent materials of the present invention are prepared by adding condensed phosphoric acid in droplet form onto an agitated soda ash bed containing, in addition, either sodium tripolyphosphate or sodium tripolyphosphate and sodium sulfate. The mixer is equipped with a jacketed cooling device in order to control the temperature at the indicated values. The following table summarizes the various products.

TABLE 3

| | Condensed Phosphoric Acid, percent $P_2O_5$ by weight | Mole Ratio $Na_2CO_3/P_2O_5$ of acid [1] | Max. Temp. reached, °C. | Bulk density, g./cc. | $P_2O_4$, percent by weight | $H_2O$, percent by weight | $Na_2O$, percent by weight | $CO_2$, percent by weight | pH, 1% solution, 25° C. | Gas evolved in contact with $H_2O$, cc./g. sample | Calcium sequestering value, g. Ca/ 100 g. sample |
|---|---|---|---|---|---|---|---|---|---|---|---|
| (1) | 83 | 2.00 | 45 | .65 | 42.0 | 6.3 | 35.2 | 16.5 | 7.4 | 61.8 | 3.5 |
| (2) | 76 | 1.68 | 45 | .82 | 48.0 | 7.2 | 34.6 | 10.2 | 7.1 | 41.6 | 3.7 |
| (3) | 83 | 1.46 | 45 | .50 | 39.5 | 7.1 | | 9.5 | 7.6 | 32.6 | 3.9 |
| (4) | 76 | 1.76 | 30 | .67 | 46.1 | 7.1 | 34.6 | 12.2 | 7.1 | 53.6 | 3.6 |

[1] NOTES.—Reactants of (1) include 19% by weight of sodium tripolyphosphate.
Reactants of (2) include 49% by weight of sodium tripolyphosphate.
Reactants of (3) include 25% by weight of sodium tripolyphosphate and 25% by weight of sodium sulfate.
Reactants of (4) include 41% by weight of sodium tripolyphosphate.

As mentioned hereinbefore, the alkali metal condensed phosphate material of the present invention are useful in water-softening applications and detergent compositions. The alkali metal condensed phosphate material including the effervescent material are excellent builders in synthetic organic active detergent compositions of the anionic, nonionic and amphoteric types. The effervescent material is a particularly well-suited builder in that although the dry ingredients are normally stable and free-flowing, when contacted with water a reaction takes place with liberation of carbon dioxide which aids the dissolution of the builder in aqueous media by disintegrating the compositions. This action also aids the dissolution of the other materials present in the detergent compositions, thus enabling a more rapid and uniform dissolution rate.

As previously mentioned, the improved builder may be used with any of the conventional detergents classed as synthetic anionic, nonionic and/or amphoteric surface active compounds which are suitable as cleansing agents. Anionic surface active compounds can be broadly described as compounds which contain hydrophilic and lyophilic groups in their molecular structure and which ionize

TABLE 2

| | Condensed Phosphoric acid, percent $P_2O_5$ by weight | Na/P, Ratio of reactants | Max. Temp. reached, 0° C. | Bulk density, g./cc. | $P_2O_5$, percent by weight | $H_2O$, percent by weight | $Na_2O$, percent by weight | $CO_2$, percent by weight | pH, 1% solution at 25° C. | Gas evolved contact with $H_2O$, cc./g. sample | Calcium sequestering value, g. Ca/100 g. sample |
|---|---|---|---|---|---|---|---|---|---|---|---|
| (1) | 76 | 1.9 | 40 | .63 | 41.8 | 13.2 | 34.6 | 10.4 | 7.2 | 44 | 1.1 |
| (2) | 76 | 2.1 | 40 | .75 | 35.1 | 11.0 | 32.2 | 21.6 | 7.1 | 62 | 1.1 |
| (3) | 76 | 2.3 | 75 | .70 | 37.2 | 11.7 | 37.3 | 13.8 | 8.2 | 27 | 1.1 |
| (4) | 76 | 2.4 | 100 | .65 | 36.7 | 11.6 | 38.7 | 13.2 | 8.4 | 24 | 1.0 |
| (5) | 83 | 2.1 | 45 | .75 | 28.8 | 5.9 | 28.2 | 27.1 | 7.1 | 116 | 2.5 |
| (6) | 83 | 2.1 | 75 | .68 | 31.5 | 6.5 | 31.5 | 20.1 | 7.2 | 94 | 2.7 |
| (7) | 83 | 2.3 | 100 | .61 | 38.5 | 7.6 | 37.8 | 16.1 | 8.5 | 16 | 3.3 | in an aqueous medium to give anions containing the lyophilic group. These compounds are usually the alkali metal salts of organic sulfonates or sulfates, particularly the sodium salts, such as alkyl aryl sulfonates (e.g., sodium dodecylbenzene sulfonate), sulfates of straight chain primary alcohols (e.g., sodium lauryl sulfate) and the like. Nonionic surface active compounds can be broadly described as compounds which do not ionize but acquire hydrophilic characteristics from an oxygenated side chain, usually polyoxyethylene, while the lyophilic part of the molecule may come from fatty acids, phenols, alcohols, amides or amines. For example purposes only, the polyethylene oxide condensates of alkyl phenols (e.g., condensation product formed from 1 mole nonyl phenol and 10 moles ethylene oxide), the condensation products of aliphatic alcohols and ethylene oxide (e.g., condensation product formed from 1 mole tridecanol and 12 moles ethylene oxide) are suitable nonionic surface active compounds in practicing the invention. Amphoteric surface active compounds can be broadly described as compounds which have both anionic and cationic groups in the same molecule. Examples of such compounds are sodium N-methyl taurate and N-coco beta amino propinate.

Although the preferred organic actives for formulation purposes are dry, solid materials, liquid organic actives can be employed if they do not contain water in sufficient amounts to initiate the effervescent builder reaction.

The amount of builder necessary to be used with the surface active compound (active) may vary depending upon, inter alia, the end use, type of active employed, pH conditions and the like. It should also be noted that the builder of the instant invention may be used in conjunction with the conventional polyphosphate builders. For example, a builder containing a ratio by weight of sodium tripolyphosphate and the effervescent builder composition with 1:10 and 10:1 functions, in some instances, better as a builder than either when used individually. The new builders can be employed with detergents as above described in any desired proportions. The optimum active/builder ratio depends upon the particular active employed and the end use for which the mixture is intended but most generally will fall within the range of an active/builder weight ratio of 4:1 to 1:4, which is, therefore, the preferred range to practice the invention.

The resulting detergent composition, that is, the active and the builder, of the present invention is generally effective when used in aqueous systems in conventional amounts such as is normally used with detergents compositions containing known builders (e.g., polyphosphates) and which is generally about .2% concentration or below.

While a detergent composition in accordance with this invention need contain only a detergent active of the class described and the builder of the instant invention, it will be appreciated that the incorporation in the mixture of additional ingredients commonly used with cleansing agents, such as perfume, anti-redeposition agents (e.g., carboxymethylcellulose), brightening agents (e.g., fluorescent dyes) and the like, is contemplated as being within the invention.

The invention is not to be limited to any particular method of mixing the builder and the organic detergent active. The builder may be mechanically mixed in, slurried with, or dissolved in the detergent active. In addition, the builder may be admixed with the organic detergent active as well as being added simultaneously or separately to an aqueous solution. In any event, the builder is intended to be used with the organic active detergent active at the time of application as a cleansing agent.

A preferred embodiment of the detergent composition of the present invention using the effervescent builder is a detergent tablet. The tablet may be prepared by methods, such as, compacting the granulated detergent composition in a suitable mold under sufficient pressure in order for the tablet to retain its shape and have sufficient surface and internal strength to withstand ordinary handling and packaging without fracturing or crumbling. Usually pressures in excess of about 25 lbs./sq. in. are suitable and, in general, the pressures need not be in excess of about 800 lbs./sq. in. The detergent tablets of the present invention may be made of various shapes and sizes depending upon the purpose for which they are to be used.

In order to illustrate the effect which the effervescent builder composition has on the dissolution rate of an anionic-type detergent tablet, the following test was conducted. Anionic-type detergent tablets, about 1¾ inches in diameter and weighing about one ounce formulated as follows were prepared:

| Additive: | Percent by weight |
|---|---|
| Effervescent builder (1) | 60.0 |
| Sodium metasilicate, anhydrous | 10.0 |
| Sodium dodecyl benzene sulfonate | 20.0 |
| Sodium sulfate | 9.0 |
| Sodium carboxymethyl cellulose | 1.0 |
| | 100.0 |

(1) Effervescent builder analyzed as follows:

| | |
|---|---|
| Percent $P_2O_5$ by weight | 42.0 |
| Percent $H_2O$ by weight | 6.28 |
| Percent $CO_2$ by weight | 16.52 |
| Bulk density (g./cc.) | .65 |
| pH, 1% solution at 25° C. | 7.4 |
| Vol. of gas evolved in contact with water at 25° C. (cc./g.) | 61.8 |
| Calcium sequestering value of calcium g./100 g. sample | 3.5 |

One tablet was tested fresh while another tablet was aged 8 days by cycling in a humidity cabinet ranging from 120° F., 85% RH to 75° F., 50% RH per day. The tablets were placed in 2000 ml. of water at 50° C. with no agitation and checked for rate of dissolution. The fresh tablet exhibited a rate of dissolution of about 1½ minute while the aged tablet exhibited a rate of dissolution of about 2 minutes. A fresh tablet formulated with conventional sodium tripolyphosphate in lieu of the effervescent builder composition when tested under identical conditions exhibited a rate of dissolution in excess of 15 minutes. This dramatically illustrates the ability of the effervescent builder material to effect a rapid rate of dissolution even when compacted with other additives in tablet form.

This application is a continuation-in-part of application, Ser. No. 266,170, filed Mar. 19, 1963.

What is claimed is:

1. A free-flowing, effervescent composition comprising an alkali metal condensed phosphate, free alkali metal carbonate and free condensed phosphoric acid, said composition having an alkali metal to phosphorous molar ratio of between about 1:1 to about 5:1 and the ability to sequester in an aqueous solution at least 1 gram of calcium per 100 grams of said composition.

2. The method of preparing the composition of claim 1 comprising adding under substantially anhydrous conditions liquid condensed phosphoric acid to an agitated bed of alkali metal carbonate material to produce droplets of condensed phosphoric acid on said bed which partially react with said alkali metal carbonate material.

3. The method of claim 2 wherein the temperature during the admixing is maintained from about 20° C. to about 75° C. and said alkali metal is sodium.

4. The composition of claim 1 wherein the pH of a 1% by weight aqueous solution of said composition at 25° C. is between about 6.5 and about 8.5.

5. The composition of claim 4 wherein the volume of gas evolved when said composition is contacted with water at about 25° C. is between about 5 to about 200 cubic centimeters per gram of said composition.

6. The composition of claim 5, wherein said alkali metal is sodium.

7. The composition of claim 5 wherein said composition has the following elemental analysis by weight percent:

| | |
|---|---|
| $P_2O_5$ | 20 to 60 |
| $H_2O$ | 2 to 30 |
| $M_2O$ | 10 to 60 |
| $CO_2$ | 10 to 35 | wherein M is sodium.

8. A free-flowing, effervescent encapsulated composition comprising free condensed phosphoric acid coated with a conglomerate mass of alkali metal condensed phosphates and free alkali metal carbonate, said composition having an alkali metal to phosphorus molar ratio of between about 1:1 to about 5:1 and the ability to sequester in an aqueous solution at least 1 gram of calcium per 100 grams of said composition.

9. A free-flowing, effervescent composition comprising alkali metal condensed phosphate, free alkali metal carbonate, free condensed phosphoric acid and an inorganic alkaline material selected from the group consisting of hydroxide, sulfates, phosphates, silicates and mixtures thereof, said composition having an alkali metal to phosphorus molar ratio of between about .5:1 to about 5:1 and the ability to sequester in an aqueous solution at least 1 gram of calcium per 100 grams of said composition.

10. The composition of claim 9 wherein said inorganic alkaline material is an alkali metal material.

11. A detergent composition comprising a water soluble organic active detergent selected from the group consisting of alkali metal salts of alkyl benzene sulfonates and sulfates of primary alcohols and polyoxyethylene oxide condensates of alkyl phenols, fatty acids, alcohols, amides and amines, and an amorphous, non-vitreous, free-flowing alkali metal condensed phosphate having an alkali metal to phosphorus molar ratio of between about .5:1 to about 5:1 and the ability to sequester in an aqueous solution at least 1 gram of calcium per 100 grams of said phosphate.

12. A detergent composition comprising a water soluble organic active detergent component selected from the group consisting of alkali metal salts of alkyl benzene sulfonates and sulfates of primary alcohols and polyoxyethylene oxide condensates of alkyl phenols, fatty acids, alcohols, amides and amines, and a free-flowing effervescent builder component comprising an alkali metal condensed phosphate material, free alkali metal carbonate material and free condensed phosphoric acid, said component having an alkali metal to phosphorus molar ratio of between about 1:1 to about 5:1 and the ability to sequester in an aqueous solution at least 1 gram of calcium per 100 grams of said builder component.

13. The detergent composition of claim 12 wherein said effervescent builder component and said organic active component are present in amounts between the weight ratio of 1:4 and 4:1, respectively and said alkali metal is sodium.

14. A detergent composition comprising a water soluble organic active detergent component selected from the group consisting of alkali metal salts of alkyl benzene sulfonates and sulfates of primary alcohols and polyoxyethylene oxide condensates of alkyl phenols, fatty acids, alcohols, amides and amines, and a free-flowing effervescent builder component comprising alkali metal condensed phosphate material, free alkali metal carbonate material, free condensed phosphoric acid and an inorganic alkaline material selected from the group consisting of hydroxides, sulfates, phosphates, silicates and mixtures thereof, said builder component having an alkali metal to phosphorus molar ratio of between about .5:1 to about 5:1 and the ability to sequester in an aqueous solution at least 1 gram of calcium to 100 grams of said builder component.

15. The detergent composition of claim 14 wherein said effervescent builder component and said active component are present in amounts between the weight ratio of 1:4 and 4:1, respectively and said alkali metal is sodium.

References Cited by the Examiner
UNITED STATES PATENTS

| | | | |
|---|---|---|---|
| 2,751,357 | 6/1956 | Bowman et al. | 252—135 |
| 2,811,419 | 8/1957 | Hartlapp et al. | 23—107 |
| 3,062,620 | 11/1962 | Sawhill | 23—107 |
| 3,081,267 | 3/1963 | Laskey | 252—135 |
| 3,122,508 | 2/1964 | Grifo et al. | 252—135 |
| 3,223,646 | 12/1965 | McKenna et al. | 252—135 |

LEON D. ROSDOL, *Primary Examiner.*

ALBERT T. MEYERS, *Examiner.*

I. GLUCK, *Assistant Examiner.*